E. H. SINGERS & R. LOFFLAND.
STAVE MOLD.
APPLICATION FILED JUNE 9, 1915.

1,285,816.

Patented Nov. 26, 1918.

Witnesses

Inventor
E. H. Singers and
By Roy Loffland.
Attorney

UNITED STATES PATENT OFFICE.

EARL H. SINGERS, OF HELTONVILLE, AND ROY LOFFLAND, OF WORTHINGTON, INDIANA, ASSIGNORS TO CEMENT PRODUCTS COMPANY, OF WORTHINGTON, INDIANA, A CORPORATION OF INDIANA.

STAVE-MOLD.

1,285,816.  Specification of Letters Patent.  Patented Nov. 26, 1918.

Application filed June 9, 1915. Serial No. 33,081.

*To all whom it may concern:*

Be it known that we, EARL H. SINGERS and ROY LOFFLAND, citizens of the United States, residing at Heltonville and Worthington, in the counties of Lawrence and Greene, and State of Indiana, respectively, have invented certain new and useful Improvements in Stave-Molds, of which the following is a specification, reference being had therein to the accompanying drawing.

This invention relates to certain new and useful improvements in stave molds for forming cement staves used in constructing cement stave silos as disclosed in our companion application of even date herewith, the object being to provide a mold by means of which, a series of staves can be formed at one time with edges having tongues and grooves formed therein.

Another object of our invention is to provide a mold especially adapted to be used for forming staves by the puddle system, in which semi-plastic material is placed in the mold and the mold is jogged until the material has thoroughly settled, the same being then placed in a steam room so as to cure the staves thus formed.

Another object of our invention is to provide a jogger for the mold in which a lateral movement is imparted thereto so as to settle the material within the mold so as to form a stave of a very compact form in order to produce a very strong and durable stave which will resist moisture to a great extent.

Another object of the invention is to provide a mold with interchangeable parts in order to allow a pair of door frames to be formed simultaneously.

Other and further objects and advantages of the invention will be hereinafter set forth and the novel features thereof defined by the appended claims.

In the drawings—

Like numerals of reference refer to like parts in the several figures of the drawings.

In carrying out our invention, we employ a rectangular open-ended tray 1 approximately seven feet by three feet wide, in which is arranged a series of transversely arranged corrugated partitions 2 preferably eight in number, in order that seven staves can be molded at one time, these partitions being obliquely arranged and of such a shape that the side edges of the staves will be formed with two grooves and two tongues so as to allow the staves to be interlocked when they have been thus formed.

Figure 1:
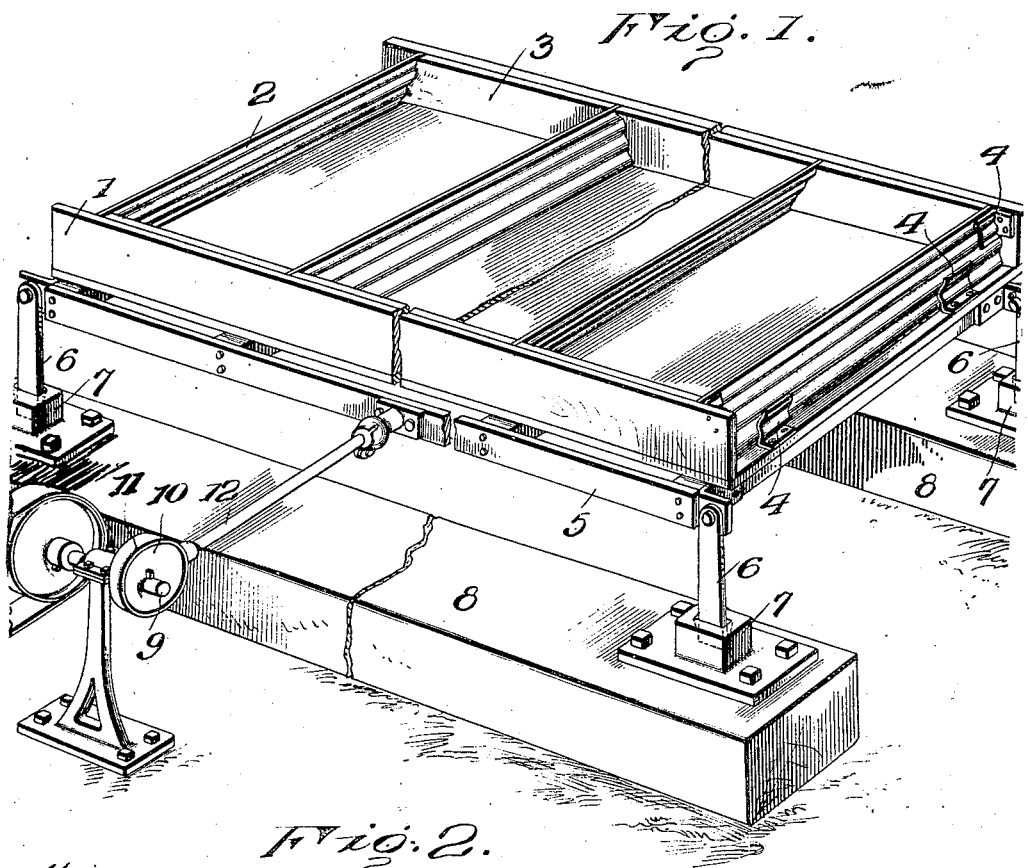
Figure 1, is a perspective of a mold constructed in accordance with our invention, showing the same in position upon a jogger.
Figure 2:
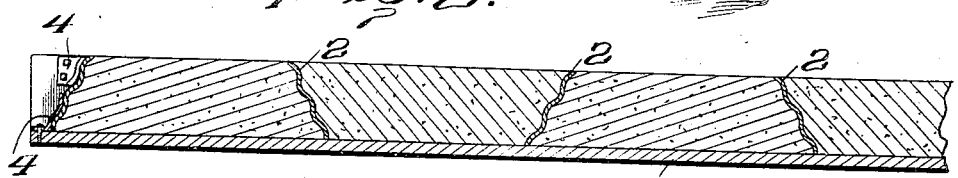
Fig. 2, is a longitudinal section through the mold.

The corrugated partitions 2 are held apart by end pieces 3, the ends of which are shaped to conform to the configuration of the partitions and in inserting these partitions and end pieces, the end pieces which are somewhat V-shaped, are arranged alternately with their greatest length at the top and bottom of the tray so as to hold the partitions obliquely as shown in Figs. 1 and 2, the end partitions being held in position by cleats 4 secured to the bottom and sides of the tray.

The spaces between the partitions and end pieces are then filled with semi-plastic material and it will be seen that the face of a stave thus formed, starting at one end of the mold, is in a plane with the inner face of the adjacent stave, as the corrugated side pieces are so arranged that each intermediate side piece forms a pair of grooves and a pair of tongues on the adjacent staves formed in the mold, which is clearly shown in Fig. 2, whereby the expense and labor involved in molding a double tongued and grooved stave is greatly reduced and the same result is obtained.

After the tray has been thus filled with semi-plastic material, the same is placed upon a jogged frame 5 supported by vertically disposed springs 6 mounted in suitable bearings 7 carried by base timbers 8 so as to allow the frame to vibrate laterally, and in order to accomplish this result, we provide a power shaft 9 with an eccentric 10 carrying an eccentric sleeve 11 to which is connected a pitman 12 which has a universal connection with the frame 5 so that when the power shaft is revolved, the frame will be reciprocated back and forth so as to jogger the mold arranged thereon.

After the mold containing the semi-plastic material to form the staves, has been jogged the desired length of time, the same is transferred to a steam room so as to cure the staves thus formed.

Figure 3:
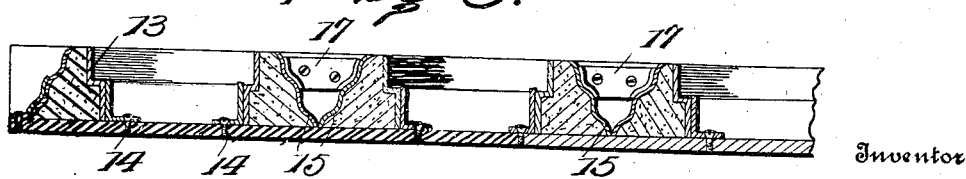
Fig. 3, is a longitudinal section through a slightly modified form of mold for forming door frames.

In Fig. 3, we show a transverse section through the tray 1 in which end-corrugated partitions are arranged within the tray having centrally arranged core pieces 13 secured in position by cleats 14; the central partitions 15 being arranged so as to assume a V-shape in cross section and are held in position by spacing cleats 17. The core pieces are provided with offset portions so that the blocks thus formed will have rabbeted-edged openings to form door openings, the blocks thus forming door frames and while we have shown in Fig. 3, cleats for securing or holding the corrugated partitions between the respective pairs of door frames thus formed, the spaces between said partitions can be filled with cement in order to hold the partitions in their proper positions or any other suitable means can be employed for holding the corrugated partitions in the desired position to form double tongues and grooves on the respective side edges of the door frames.

From the foregoing description, it will be seen that we have provided a mold in which a series of corrugated partitions is arranged in such a manner that the staves formed therein are arranged with their inner faces in horizontal alinement with the outer faces of the adjacent staves, so that the same will have the proper angle at the edges in order to allow the staves to be interlocked to form a circular silo.

We claim:

1. A mold, comprising a tray having a series of alternately arranged partitions oblique with reference to the plane of the base of the tray, and end pieces for spacing said partitions within said tray.

2. A mold for forming cement staves, comprising an open ended tray having a series of corrugated partitions arranged therein, said partitions being alternately arranged obliquely with reference to the plane of the base of the tray, and removable end pieces for spacing said corrugated partitions and for allowing the staves to be removed from the end of the tray.

3. A mold for forming cement staves having double tongues and grooves on their edges, comprising a tray having a series of corrugated partitions arranged therein, said partitions being arranged at an oblique angle with reference to the plane of the base of the tray, each partition being arranged obliquely opposite to the adjacent partition in order to form a series of nesting staves.

4. A mold for forming cement staves having double tongues and grooves on their edges, comprising a tray having a series of transversely arranged corrugated partitions, said partitions being arranged at an oblique angle with reference to the plane of the base of the tray, and end pieces having ends conforming in shape to said partitions for holding said partitions alternately obliquely within said tray.

In testimony whereof we hereunto affix our signatures in the presence of two witnesses.

EARL H. SINGERS.
ROY LOFFLAND.

Witnesses:
RUSSELL G. EAST,
JOSEPH HOUSUM.